United States Patent [19]

Kamiya et al.

[11] Patent Number: 4,652,616

[45] Date of Patent: Mar. 24, 1987

[54] CHLORINATED ETHYLENE COPOLYMER RESINS

[75] Inventors: Takeshi Kamiya, Kamakura; Kazuo Matsuura, Tokyo; Mituji Miyoshi, Fujisawa; Kozo Misumi, Sennan; Seiji Kadomatsu, Toyonaka; Shinji Nose, Kobe, all of Japan

[73] Assignees: Nippon Petrochemicals Co. Ltd.; Osaka Soda Co., both of Japan

[21] Appl. No.: 719,354

[22] Filed: Apr. 3, 1985

[30] Foreign Application Priority Data

Apr. 6, 1984 [JP] Japan ................................. 59-69296

[51] Int. Cl.$^4$ ............................................. C08F 8/22
[52] U.S. Cl. ............................ 525/331.7; 525/332.1; 525/356
[58] Field of Search ........................... 525/331.7, 332.1

[56] References Cited

U.S. PATENT DOCUMENTS

| | | | |
|---|---|---|---|
| 3,896,095 | 7/1975 | Morrissey | 525/331.7 |
| 3,936,430 | 2/1976 | Schoen et al. | 525/331.7 |
| 4,433,105 | 2/1984 | Matsuda et al. | 525/332.1 |

FOREIGN PATENT DOCUMENTS 57-177004 10/1982 Japan .
59-221303 12/1984 Japan .

Primary Examiner—Joseph L. Schofer
Assistant Examiner—Bernard Lipman
Attorney, Agent, or Firm—Scully, Scott, Murphy & Presser

[57] ABSTRACT

A chlorinated ethylene copolymer resin having a chlorine content of 5–50% by weight obtained by chlorinating an ethylene copolymer resin by the aqueous suspension method at a temperature of 100° C. or higher in at least one chlorination stage, said copolymer resin being obtained by copolymerizing ethylene and as at least one comonomer 0.02–2.0 mol % of a nonconjugated diene using a polymerization catalyst comprising a solid catalytic component containing at least magnesium and titanium and an organic aluminum compound and having a maximum peak temperature according to the differential scanning calorimetry (DSC) of 100° C. or higher.

6 Claims, No Drawings

CHLORINATED ETHYLENE COPOLYMER RESINS

BACKGROUND OF THE INVENTION

1. Field of the Invention

The present invention relates to chlorinated ethylene copolymers with superior rubbery properties. More particularly, it is concerned with chlorinated ethylene/-nonconjugated diene copolymers which are capable of forming rubbery vulcanized product with superior properties by vulcanization.

2. Description of the Prior Art

It is well known that ethylene/α-olefin/nonconjugated diene copolymer rubber forms a rubbery material superior in properties such as ozone resistance and heat resistance by vulcanization. Use of said copolymer rubber is, however, limited because of its poor oil resistance, adhesivity and covulcanizability. It is also known that the above-mentioned poor properties can be improved by chlorinating said copolymer rubber (see Japanese Patent Publication No. 911/1966, Japanese Patent Publication No. 4829/1971). The chlorinated rubber as mentioned above, however, is unsatisfactory in that the strength is very low whether it is vulcanized or unvulcanized. In this respect, chlorinated rubber with a chlorine content of about 5-50% by weight and a Mooney viscosity (ML 1+4, 100° C.) of about 20-150 produced by chlorination of ethylene/1-butene/5-ethylidene-2-norbornene copolymer rubber having an ethylene/1-butene molar ratio of about 85/15-95/5, for example, has been proposed as being superior in strength characteristics (see U.S. Pat. No. 4,433,105). However, the above-mentioned chlorinated rubber is still unsatisfactory in rubbery properties and needs improvement also in commercial production. In fact, use of a soft copolymer rubber is reasonable as the starting material in the production of soft chlorinated rubber, and the above-mentioned terpolymer with a specific ethylene/1-butene molar ratio meets the above requirement. In the chlorination reaction by the aqueous suspension method which is commercially advantageous, however, there is a problem that the DSC peak temperature of the starting copolymer is too low. The chlorination reaction temperature in the above prior art is considered to be about 90°-70° C. Our investigations, however, have revealed that the chlorination at such a low temperature is apt to result in heterogenous addition of chlorine to give a hard chlorinated proudct as well as leads to a tendency of deteriorating the thermal stability. Whereas oil resistance of chlorinated rubber is the highest in the products with a chlorine content of 35-40% by weight, chlorinated products of the above-mentioned terpolymer rubber which have a chlorine content within the above range are harder in quality and lower in thermal stability due to cohesive energy of chlorine.

In order to produce chlorinated ethylene copolymers superior in rubbery properties as well as in oil resistance, it is necessary to employ a chlorination temperature of at lowest 100° C. which requires use of a starting ethylene copolymer having a peak temperature of at lowest 100° C. according to the DSC method.

SUMMARY OF THE INVENTION

It is an object of the present invention to provide chlorinated ethylene/nonconjugated diene copolymer resin which possess soft rubbery properties with a high chlorine content.

Another object of the invention is to provide chlorinated ethylene/nonconjugated diene copolymers which when vulcanized are also of soft rubbery properties with a satisfactory elongation as well as are superior in such properties as oil resistance and thermal stability.

A further object of the invention is to provide chlorinated ethylene/α-olefin/nonconjugated diene copolymers which possess softer rubbery properties in addition to the above-mentioned characteristics.

Other objects and advantages of the present invention will be apparent from the description set forth hereinbelow.

In the present invention there are employed as the starting material for the chlorination ethylene copolymer resins prepared by copolymerizing ethylene and as at least one comonomer 0.02-2.0 mol % of a nonconjugated diene using a catalyst comprising a solid catalytic component containing at least magnesium and titanium and an organic aluminum compound. The ethylene copolymer resins have a maximum peak temperature (Tm) of at lowest 100° C. according to the differential scanning calorimetry (DSC). The ethylene copolymers which contain ethylene as the major component and a nonconjugated diene as a comonomer preferably contain as an additional comonomer from 0.01 mol % to less than 5 mol %, more preferably 0.01-4 mol % of an α-olefin on the basis of the sum of α-olefin and ethylene.

According to the invention, the above ethylene copolymer resin is chlorinated by the aqueous suspension method at a temperature of 100° C. or higher in at least one chlorination stage to provide chlorinated ethylene/nonconjugated diene copolymer resins with a chlorine content of 5-50% by weight.

DETAILED DESCRIPTION OF THE INVENTION

The nonconjugated diene to be copolymerized with ethylene in the production of the ethylene copolymer resin of the invention is those containing 5-15 carbon atoms.

Those nonconjugated dienes are, for example, acyclic nonconjugated dienes and cyclic nonconjugated dienes. Illustrative of acyclic nonconjugated dienes are such as 1,4-hexadiene, 4-methyl-1,4-hexadiene, 5-methyl-1,4-hexadiene, 1,6-octadiene, 2-methyl-1,5-hexadiene, 6-methyl-1,5-heptadiene, 7-methyl-1,6-octadiene and 1,5-hexadiene. Also, illustrative of cyclic nonconjugated dienes are such as cyclohexadiene, dicyclopentadiene, methyltetrahydroindene, divinylbenzene, norbornadiene, alkenylnorbornene such as 5-vinyl-2-norbornene, 6-chloromethyl-5-isopropenyl-2-norbornene, alkylidenenorbornene such as 5-ethylidene-2-norbornene, 5-methylene-2-norbornene, 5-isopropylidene-2-norbornene, alkenylcyclohexene such as 4-vinyl-1-cyclohexene and the like. To add, the nonconjugated diene as defined herein means those which contain at least two nonconjugated olefinic double bonds, which include not only the narrower range of dienes as mentioned above, but also trienes such as 2,3-diisopropylidene-5-norbornene, 2-ethylidene-3-isopropylidene-5-norbornene, 2-propenyl-2,5-norbornadiene, 1,3,7-octatriene, 1,4,9-decatriene and the like.

Among them, 5-vinyl-2-norbornene, 5-ethylidene-2-norbornene and 1,4-hexadiene are preferred.

The aforementioned nonconjugated diene may be copolymerized in a proportion in the range between about 0.02 and 2 mol % on the basis of ethylene or ethylene and α-olefin in the ethylene copolymer resin to achieve the object. In addition to the aforementioned nonconjugated diene, it is preferred to copolymerize an α-olefin in order to provide the chlorinated product and the vulcanized product with softer rubber properties. The α-olefin contains 3-10 carbon atoms and includes for example, propylene, 1-butene, 1-hexene, 4-methylpentene-1, 1-octene, 1-decene and mixtures of two or more of the same. The α-olefin is copolymerized in the ethylene copolymers in a proportion of from 0.01 mol % to lower than 5 mol %, preferably from 0.01 to 4 mol % on the basis of the sum of α-olefin and ethylene.

The ethylene copolymer resin of the invention is a resin prepared by the ion polymerization method with a Ziegler catalyst. The Ziegler catalyst comprises a combination of a solid catalytic component containing at least magnesium and titanium and an organic aluminum compound. The solid catalytic component containing at least magnesium and titanium is a titanium compound carried by a known method on a magnesium-containing inorganic solid compound such as metallic magnesium, magnesium hydroxide, magnesium carbonate, magnesium oxide, magnesium chloride or the like, a double salt, oxide, carbonate, chloride, hydroxide or the like containing a metal selected from silicon, aluminum or calcium and magnesium atom, or a product from treatment or reaction of such inorganic solid compound with an oxygen-containing compound, sulfur-containing compound, aromatic hydrocarbon or halogen-containing substance. Particularly preferred as the solid catalytic component containing at least magnesium and titanium used in the present invention is a reaction product of a magnesium halide, one, two or more of compounds represented by the general formula $Me(OR)_qX_{z-q}$ (wherein Me represents an element of Group I-Group VIII of the Periodic Table except Ti and V, R represents a hydrocarbon radical containing 1-20 carbon atoms, X represents a halogen atom, z represents the valence of Me and q is $0 < q \leq z$) and a titanium compound.

As the magnesium halide is used a substantially anhydrous compound, for which magnesium fluoride, magnesium chloride, magnesium bromide or magnesium iodide is exemplified. Among them, magnesium chloride is particularly preferred.

As the compounds represented by the general formula $Me(OR)_qX_{z-q}$ (wherein Me represents an element of Group I-Group VIII of the Periodic Table except Ti and V, R represents a hydrocarbon radical containing 1-20 carbon atoms, X represents a halogen atom, z represents the valence of Me and q is $0 < q \leq z$) may be mentioned a variety of compounds such as, for example, $NaOR$, $Mg(OR)_2$, $Mg(OR)X$, $Ca(OR)_2$, $Zn(OR)_2$, $Zn(OR)X$, $Cd(OR)_2$, $Al(OR)_3$, $Al(OR)_2X$, $B(OR)_3$, $B(OR)_2X$, $Ga(OR)_3$, $Ge(OR)_4$, $Sn(OR)_4$, $Si(OR)_4$, $Si(OR)_3X$, $Si(OR)_2X_2$, $P(OR)_3$, $Cr(OR)_2$, $Mn(OR)_2$, $Fe(OR)_2$, $Fe(OR)_3$, $Co(OR)_2$ and $Ni(OR)_2$. Compounds such as $NaOC_2H_5$, $NaOC_4H_9$, $Mg(OCH_3)_2$, $Mg(OC_2H_5)_2$, $Mg(OC_3H_5)_2$, $Ca(OC_2H_5)_2$, $Zn(OC_2H_5)_2$, $Zn(OC_2H_5)Cl$, $Al(OCH_3)_3$, $Al(OC_2H_5)_3$, $Al(OC_2H_5)_2Cl$, $Al(OC_3H_7)_3$, $Al(OC_4H_9)_3$, $Al(OC_6H_3)$, $B(OC_2H_5)_3$, $B(OC_2H_5)_2Cl$, $Si(OC_2H_5)_4$, $Si(OCH_3)_3Cl$, $Si(OC_2H_5)_2Cl_2$, $Si(OC_6H_5)_2Cl_2$, $P(OC_2H_5)_3$, $P(OC_6H_5)_3$ and $Fe(OC_4H_9)_3$ may be mentioned as more preferable examples.

Particularly preferred in the present invention are compounds represented by $Si(OR)_qX_{4-q}$, $Al(OR)_qX_{3-q}$, $B(OR)_qX_{3-q}$ and combinations of two or more these compounds. Particularly preferred as R are alkyl groups containing 1-4 carbon atoms and phenyl group.

As the titanium compounds used in the invention may be mentioned titanium halides, titanium alkoxyhalides, titanium alkoxides, titanium halogenoxides and the like. Tetravalent titanium compounds and trivalent titanium compounds are preferred titanium compounds. As the tetravalent titanium compounds are preferred compounds represented by the general formula $Ti(OR)_nX_{4-n}$ (wherein R represents a hydrocarbon radical containing 1-20 carbon atoms, X represents a halogen atom and n is $0 \leq n \leq 4$). There may be mentioned titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, tetraphenoxytitanium and the like. As the trivalent titanium compounds are mentioned titanium trihalides obtained by the reduction of a titanium tetrahalide such as titanium tetrachloride or titanium tetrabromide with hydrogen, aluminum, titanium or an organic metal compound of metals of Groups I-III of the Periodic Table. Also are mentioned trivalent titanium compounds obtained by the reduction of a tetravalent halogenated alkoxytitanium represented by the general formula $Ti(OR)_mX_{4-m}$ (wherein R represents a hydrocarbon radical containing 1-20 carbon atoms, X represents a halogen atom and m is $0 < m < 4$) with an organic metal compound of metals of Groups I-III of the Periodic Table. As preferable solid catalytic components may be mentioned illustratively reaction products of a magnesium halide, $Al(OR)_mX_{3-m}$, $Si(OR')_nX_{4-n}$ and a titanium compound (Japanese Patent Laid Open No. 95909/1981, Japanese Patent Application No. 65234/1981, Japanese Patent Application No. 68684/1981), reaction products of a magnesium halide, $Me(OR)_mX_{z-m}$ (wherein z is the valence of the metal Me), $Si(OR')_nX_{4-n}$ and a titanium compound (Japanese Patent Application No. 68685/1981), reaction products of a magnesium halide, $R_mSi(OR)_nX_{4-m-n}$, $Me(OR)_mX_{z-m}$ and a titanium compound (Japanese Patent Application No. 108713/1981), reaction products of a magnesium halide, $Me(OR)_mX_{z-m}$ and a titanium compound (Japanese Patent Application No. 132085/1981), reaction products a magnesium halide, $Al(OR)_mX_{3-m}$ and a titanium compound (Japanese Patent Laid Open No. 64381/1975, Japanese Patent Laid Open No. 124976/1975) and the like.

The polymerization reaction is carried out with oxygen and water substantially excluded in gaseous phase or in the presence of an inert solvent, or using the monomers per se as the solvent. Polymerization conditions for the above-mentioned olefins are at a temperature of 20°-300° C., preferably 40°-200° C. and under ordinary pressure to a pressure of 70 kg/cm²·G, preferably under pressure of 2-60 kg/cm²·G. Molecular weight can effectively controlled by the addition of hydrogen to the polymerization system, although it is controllable to a certain degree by changing polymerization conditions such as polymerization temperature and molar ratio of the catalyst. Two or more multistage polymerization reaction can also be performed without trouble by changing polymerization conditions such as hydrogen concentration and polymerization temperature.

The ethylene copolymer resin produced in such a way as described above which has a maximum peak temperature (Tm) of 100° C. or higher according to the differential scanning calorimetry (DSC) is distinctly differentiated from commercially available products such as ethylene/propylene/diene copolymer rubber.

As a matter of fact, prior-art rubbery products such as the ethylene/propylene/diene copolymer rubber have almost no degree of crystallinity, in which crystalline regions, if any, are very small. When measured actually, the maximum peak temperature (Tm) by DSC is below 100° C. for any of the rubbery products. The Tm according to DSC is a value not directly correlated with the degree of crystallinity, although it is correlated with the crystal form of a polymer.

Measurement according to the differential scanning calorimetry (DSC) is made as follows: Approximately 5 mg of a specimen is precisely weighed and set in a DSC, temperature of which is raised to 170° C. and maintained at that level for 15 min. Then, the temperature is reduced to 0° C. at a rate of 2.5° C./min. Subsequently from this level, the temperature is raised to 170° C. at a rate of 10° C./min. to complete the measurement. The maximum peak temperature (Tm) is expressed by a temperature at which top of the maximum peak among the peaks appearing during the temperature rise from 0° C. to 170° C. is positioned.

The ethylene copolymer resins mentioned above which also have a density of 0.900 g/cm$^3$ or higher, preferably 0.910 g/cm$^3$ or higher and 0.960 g/cm$^3$ or lower, preferably 0.955 g/cm$^3$ or lower, and a melt index of 20 g/10 min. or less are employed.

Such ethylene copolymer resin can usually be chlorinated without pulverization. If necessary, however, it is finely divided by mechanical pulverization, and subjected in aqueous suspension to chlorination at a chlorination temperature of 100° C. or above in the chlorination stage, that is, at a temperature around the peak temperature by the DSC for the starting ethylene copolymer resin. Due to a high peak temperature for the starting material of the present invention, the mechanical pulverization can easily be carried out at ordinary temperature. In practice, the chlorination is conducted by introducing gaseous chlorine to a prescribed chlorine content into a suspension of starting ethylene copolymer resin and water at a weight ratio of resin/water of approximately 0.5-2/10 to which auxiliaries such as suspending agent and wetting agent have been added. The chlorination temperature, which is 100° C. or higher, means that it is necessary to carry out at least one stage of the chlorination reaction at 100° C. or higher. The chlorination temperature may be lower, for example, in the initial chlorination stage. Although there is no upper limit to the chlorination temperature, in general a temperature below 150° C. is sufficient. After completion of the chlorination reaction, the reaction product is washed with water repeatedly by a conventional method and dried.

The chlorinated ethylene copolymer resins thus obtained have a chlorine content of about 5-50% by weight, preferably 5-40% by weight and a Mooney viscosity (ML$_{1+4}$, 100° C.) of about 20-150, preferably about 30-80. A lower chlorine content produces unsatisfactory efficiency of chlorination, and a higher chlorine content results in higher hardness with loss of rubbery characteristics. Besides, when an α-olefin is employed as a component of the starting copolymer in addition to the nonconjugated diene, it is necessary to maintain the level of the α-olefin at from 0.01 mol % to less than 5 mol %, preferably from 0.01 to 4 mol % on the basis of the sum of α-olefin and ethylene. At a level of 5 mol % or higher, hardness of the product will be too high at a chlorine content of about 30% by weight or higher to exert good rubbery properties.

The chlorinated ethylene copolymers according to the present invention not only possess such properties as excellent weathering, ozone resistance, flammability and adhesivity as with prior-art chlorinated ethylene/α-olefin/nonconjugated diene copolymer rubbers but also maintain soft rubbery characteristics including low hardness even with a high chlorine content in such a range as producing good oil resistance. Thermal stability and processability are also excellent, and conventional vulcanizing agents can be employed at a fast vulcanization rate to produce a product with high oil resistance.

In vulcanizing the chlorinated ethylene copolymers of the invention, sulfur vulcanizing agents conventionally used for the diene rubber such as, for example, sulfur, morpholine polysulfides and thiuram polysulfides may be employed without any modification. In addition to the above, vulcanization accelerators such as the accelerators for diene rubber including thiuram sulfides, mercaptobenzothiazole and derivatives thereof, dithiocarbamates, xanthates, dithiophosphates, amines, as well as zinc compounds such as zinc oxide and zinc stearate may be employed with excellent results. Furthermore, use of additives usually used in vulcanization such as filling agents, reinforcing agents, plasticizers, stabilizers, antioxidants, lubricants, tackifiers, pigments and antiflaming agents is effective, which additives may optionally be selected. Addition of a certain metal compound or epoxy compound that can be an acid-scavenger is also very favorable in view of the thermal stability of the vulcanized compositions. Such metal compounds include oxides, hydroxides, carbonates, carboxylates, silicates and phosphites of Group II metals of the Periodic Table, oxides, basic carbonates, basic carboxylates and basic phosphites of Group IV metals of the Periodic Table and the like. As the epoxy compounds are mentioned the reaction product of bisphenol A and epichlorohydrin and epoxylated soybean oil.

The chlorinated ethylene copolymers of the invention may be covulcanized after blended with other elastomers. Particularly the blend copolymers with diene rubber possess favorable capacities. As the elastomers to be blended may be mentioned natural rubber, styrene/butadiene copolymers, polybutadienes, butadiene/acrylonitrile copolymers, isoprene/isobutyrene copolymers, ethylene/propylene/nonconjugated diolefin terpolymers, halogenated isoprene/isobutyrene copolymers, chlorosulfonated polyethylenes, chlorinated polyethylenes, polychloroprenes, epichlorohydrin/allylglycidylether copolymers, epichlorohydrin/ethylene oxide/allylglycidylether terpolymers and the like.

The vulcanization is usually carried out by heating a compounded material including a chlorinated product of the invention as described above at 100-200° C. for 1-120 min. The chlorinated product of the present invention is blended by a conventional means such as with an open roll, a blender or a kneader. The vulcanization may be effected by various methods such as press molding by means of a metal mold, injection molding, steam vulcanization oven, air bathing or use of an electromagnetic vulcanizer.

The vulcanized products of the chlorinated copolymer resins of the present invention themselves can be used as, for example, electrical insulating materials, roofings and exterior or interior parts of automobiles.

The invention will be described in more details by the following example.

EXAMPLE

Experiment 1

(Preparation of ethylene copolymer resin)

(a) Preparation of solid catalytic component

In a stainless steel pot 400 ml. in inner volume which had contained 25 stainless steel balls each ½ inch in diameter were placed 100 g. of commercially available anhydrous magnesium chloride, 2.3 g. of triethoxyaluminum and 2.5 g. of titanium tetrachloride. The mixture was ball-milled in nitrogen atmosphere at room temperature for 16 hours. Subsequently, 2.5 g. of tetraethoxysilane was added, and the ball milling was carried out for additional 16 hours. There was contained 36 mg. of titanium in 1 g. of the solid catalytic component obtained after the ball milling.

(b) Polymerization

In a 20-liter stainless steel autoclave equipped with an induction stirrer which had been purged with nitrogen was placed 10 l of hexane, followed by addition of 10 mmol of triethylaluminum and 100 mg. of the solid catalytic component. Temperature of the mixture was raised to 70° C. with stirring. The system was at a pressure of 1 kg/cm$^2$·G due to vapor pressure of the hexane, into which hydrogen was introduced to a total pressure of 3 kg/cm$^2$·G. There was then charged ethylene to a total pressure of 10 kg/cm$^2$·G together with 630 g. of 1-butene and 150 ml. of 5-vinyl-2-norbornene (VBH) to initiate polymerization. The polymerization was conducted for 2 hours while maintaining the autoclave at a pressure of 10 kg/cm$^2$·G. After completion of the polymerization, the polymer slurry was transferred to a centrifuge to separate the hexane. The hexane was removed under reduced pressure to give 3.5 kg. of a white ethylene copolymer resin powder which had a melt index (MI) of 0.45 g/10 min., a density of 0.925 g/cm$^3$ and a bulk density of 0.34. The catalytic activity was 2,500 g/g·cat·ethylene pressure or 69,400 g/g·Ti·hr·ethylene pressure.

Measurement was made for VBH content of the copolymer by means of $^{13}$C NMR, which was 0.1 mol %. Peak temperature according to DSC was 121° C.

(Preparation of chlorinated ethylene copolymer)

The ethylene/VBH/1-butene copolymer resin obtained above was mechanically pulverized at room temperature to a particle size passing through 32 mesh (Tyler No.) screen. In a glass-lined autoclave 100 l in inner volume was placed 5 kg. of the powdered ethylene copolymer resin together with 70 l of ion-exchanged water, 2 g. of a wetting agent and 200 ml. of a dispersing agent. Reaction was initiated at 100° C. while introducing gaseous chlorine with stirring. The same temperature was maintained to a chlorine content of the copolymer of 10% by weight. Thereafter, the chlorination was conducted at 115°–120° C. to a chlorine content of 27% by weight. The product was washed with water and dried by conventional procedures. The chlorinated ethylene copolymer was preheated in a hot press at 150° C. for 5 min. and then pressed under a pressure of 100 kg/cm$^2$ for 4 min., followed by cold pressing under the same pressure to yield a sheet 2.5 mm in thickness. The sheet was measured for tensile stress at break, elongation at break and surface hardness according to JIS K-6301.

Next, in order to determine the properties of the vulcanized chlorinated copolymer resin, a pressed sheet having a thickness of 2 mm was prepared from the compound copolymer resin having the following formulation.

| Ingredient | Parts by weight |
|---|---|
| Chlorinated copolymer resin | 100 |
| Zinc stearate | 6 |
| Magnesium oxide | 11 |
| HAF carbon black | 20 |
| Mercapto Benzothiazol | 0.7 |
| Tetramethylenethiuram Disulfide | 1.8 |
| Sulfur | 1.0 |

The pressed sheet was prepared by kneading the compounded copolymer resin by using 8 inch rolls, followed by the vulcanization under pressing for 30 minutes at a temperature of 160° C.

The vulcanized sheet was measured for tensile stress and elongation at break, surface hardness and oil resistance according to JIS K-6301. The oil resistance test was performed by measuring the percent swelling of a vulcanized sheet immersed in JIS No. 3 oil at 120° C. for 3 days. (The method of vulcanization and the method of measurement were the same hereinbelow through the experiment examples )

Experiment 2

(Preparation of ethylene copolymer resin)

(a) Preparation of solid catalytic component

In a stainless steel pot 400 ml. in inner volume which had contained 25 stainless steel balls ½ inch in diameter were placed 10 g. of commercially available anhydrous magnesium chloride, 2.6 g. of triethoxyaluminum and 2.1 g. of titanium tetrachloride. The mixture was ball-milled in nitrogen atmosphere at room temperature for 16 hours. There was contained 37 mg. of titanium in 1 g. of the solid catalytic component obtained after the ball milling.

(b) Polymerization

In a 20-liter stainless steel autoclave equipped with an induction stirrer which had been purged with nitrogen was placed 10 l of hexane, followed by addition of 10 mmol of triethylaluminum and 100 mg. of the solid catalytic component prepared above. Temperature of the mixture was raised to 70° C. with stirring. The system was at a pressure of 1 kg/cm$^2$·G due to vapor pressure of the hexane, into which hydrogen was introduced to a total pressure of 2 kg/cm$^2$·G. There was then charged ethylene to a total pressure of 10 kg/cm$^2$·G together with 1000 ml. of 1,4-hexadiene (hereinbelow called 1,4-HD for short) to initiate polymerization. The polymerization was conducted for 2 hours while maintaining the autoclave at a pressure of 10 kg/cm$^2$·G. After completion of the polymerization, the polymer slurry was transferred to a centrifuge to separate the hexane. The hexane was removed under reduced pressure to give 2.7 kg. of a white ethylene copolymer powder which had a melt index (MI) of 0.50 g/10 min., a density of 0.945 g/cm$^3$ and a bulk density of 0.38. The catalytic activity was 1,690 g/g·cat·hr·ethylene pressure or 45,600 g/g. Ti·hr·ethylene pressure. Measurement was made for 1,4-HD content of the copolymer by means of $^{13}$C NMR, which was 0.4 mol %. Peak temperature according to DSC was 126° C.

(Preparation of chlorinated ethylene copolymer)

The ethylene/1,4-HD copolymer prepared above was subjected to a chlorination reaction in the same way as in Experiment 1. The chlorination reaction was initiated at 105° C., which temperature was maintained to a chlorine content of 15% by weight. Thereafter, the chlorination was conducted at 125°-130° C. to a chlorine content of 30% by weight. The chlorinated ethylene copolymer and its vulcanization product were obtained by the same procedures as described above.

Experiment 3

An ethylene/5-ethylidene-2-norbornene (hereinbelow called EBH for short) copolymer resin was prepared in the same way as in Experiment 2 except that 400 ml. of EBH was used as the nonconjugated diene. The copolymer powder had a melt index (MI) of 0.73, a density of 0.953, a bulk density of 0.33, an EBH content of 0.4 mol % and a peak temperature according to DSC of 128° C.

(Preparation of chlorinated ethylene copolymer)

A chlorination was carried out of the ethylene/EBH copolymer prepared above in the same way as in Experiment 2 to a chlorine content of 30% by weight. A chlorinated ethylene copolymer and its vulcanized product were obtained in the same way.

Experiment 4

The experiment was performed as a reference example.

A chlorination was carried out of a ethylene/1-butene/EBH copolymer rubber (EBH 1 mol %) with an ethylene/1-butene molar ratio of 92/8 in the same way as in Experiment 1 to a chlorine content of 15% by weight at the first-stage temperature of 100° C. and then to a chlorine content of approximately 20% by weight at the second-stage temperature of 115°-120° C. There occurred agglomeration of the aqueous suspension slurry and then reduced absorption of gaseous chlorine without producing the desired chlorinated ethylene copolymer.

Experiment 5

The experiment was performed as a reference example.

An ethylene/1,4-HD copolymer resin was prepared in the same way as in Experiment 2. The resin was subjected to a chlorination in the same way as in Experiment 1 except that the chlorination was carried out at a chlorination temperature of 80°-83° C. to a chlorine content of 32% by weight. The chlorinated ethylene copolymer thus obtained was so hard, so low in elongation at break that it is far remote from rubbery properties. Therefore, no measurements were done for vulcanization characteristics.

Experiment 6

(Preparation of ethylene copolymer resin)

A copolymer resin was prepared in the same way as in Experiment 1 except that 1,500 g. of 1-hexene was used in place of the 1-butene used in Experiment 1. The copolymer had a melt index of 0.58, a density of 0.927 and a peak temperature according to DSC of 126° C.

(Preparation of chlorinated ethylene copolymer)

The ethylene/1-hexene copolymer resin prepared above was subjected to a chlorination to a chlorine content of 30% by weight in the same way as in Experiment 2. There were obtained a chlorinated ethylene copolymer and its vulcanized product by the same procedures.

Experiments 7 and 8

The ethylene/1,4-HD copolymer resins prepared according to Experiment 2 were subjected to a chlorination to a chlorine content of 35% by weight (No. 7) and of 40% by weight (No. 8), respectively in the same way as in Experiment 2. There were obtained chlorinated ethylene copolymers and their vulcanized products by the same procedures.

Experiments 9 and 10

These experiments were done for comparison's sake.

The ethylene/1-butene/EDH rubbers of Experiment 4 were subjected to a chlorination at a chlorination temperature of 70°-75° C. to a chlorine content of 35% by weight and of 40% by weight, respectively. There were obtained chlorinated ethylene copolymer rubbers and their vulcanized products.

All of the vulcanized products were high in surface hardness and low in elongation at break so that their rubbery properties were insufficient.

The chlorinated copolymer rubbers produced in the above experiments were tested for thermal stability. Thermal stability of the chlorinated ethylene copolymer resins of Experiment 1, 11 and 12 were also tested. Results are shown in Table 2.

The test method is as follows:

The chlorinated copolymer kneaded by 8 inch rolls is preheated in a hot press at 150° C. for 5 min. and then pressed under a pressure of 100 kg/cm$^2$ for 4 min., followed by cold pressing under the same pressure to yield a sheet 2.0 mm in thickness.

After the sheet is placed in the Geer oven at 190° C. for 10 min., the degree of discoloration of the sheet is measured. The measured sheets are numbered in order of discoloration (brown color) from low degree. Namely a sheet of better thermal stability has a smaller degree of discoloration and a smaller number.

Experiment 11 and 12

(Preparation of ethylene copolymer resin)

A copolymerization was made by ethylene and VBH in the same way as in Experiment 1 except that the amounts of 1-butene and VBH were changed. There was obtained a white ethylene copolymer resin which had a MI of 0.40 g/10 min. and a density of 0.942 g/cm$^3$. VBH content of the copolymer according to $^{13}$C NMR was 0.4 mol %, and Tm according to DSC was 125° C.

(Preparation of chlorinated ethylene copolymer)

The ethylene/VBH/1-butene copolymer resins prepared above were subjected to a chlorination to a chlorine content of 35% by weight (No. 11) and 40% by weight (No. 12), respectively in the same way as in Experiment 2. There were obtained chlorinated ethylene copolymer resins and their vulcanized products by the same procedures.

The thermal stability of the chlorinated ethylene copolymer resins were also tested.

TABLE 1

| Experiment | | | 1 | 2 | 3 | 4 | 5 | 6 |
|---|---|---|---|---|---|---|---|---|
| Starting ethylene copolymer | | α-olefin | 1-butene | — | — | 1-butene | — | 1-hexene |
| | | Ethylene/α-olefin molar ratio) | 97/3 | | | 92/8 | | 97.5/2.5 |
| | | Nonconjugated diene | VBH | 1.4-HD | EBH | EBH | 1.4-HD | VBH |
| | | Nonconjugated diene (mol %) | 0.1 | 0.4 | 0.4 | 1.0 | 0.4 | 0.1 |
| | | DSC peak temperature (°C.) | 121 | 126 | 128 | 70 | 126 | 126 |
| Chlorinated ethylene copolymer | Chlorination reaction | Stage 1 temperature (°C.) | 100 | 105 | 105 | 100 | 80–83 | 105 |
| | | Stage 2 temperature (°C.) | 115–120 | 125–130 | 125–130 | 115–120 | " | 125–130 |
| | | Chlorine content (wt. %) | 27 | 30 | 30 | | 32 | 30 |
| | Physical properties unvulcanized | Stress at break (kg/cm$^2$) | 83 | 110 | 105 | Agglomerated with no powder formed. | 290 | 120 |
| | | Elongation at break (%) | 1150 | 750 | 800 | | 250 | 740 |
| | | Hardness (JISA) | 58 | 63 | 59 | | *60 | 63 |
| | Physical properties vulcanized | Stress at break (kg/cm$^2$) | 203 | 215 | 220 | | — | 220 |
| | | Elongation at break (%) | 650 | 620 | 630 | | — | 610 |
| | | Surface hardness (JISA) | 65 | 70 | 68 | | — | 70 |
| | | Oil resistance ΔV (%) | 110 | 100 | 100 | | — | 100 |
| Experiment | | | 7 | 8 | 9 | 10 | 11 | 12 |
| Starting ethylene copolymer | | α-olefin | — | — | 1-butene | 1-butene | 1-butene | 1-butene |
| | | Ethylene/α-olefin molar ratio) | | | 92/8 | 92/8 | 99.5/0.5 | 99.5/0.5 |
| | | Nonconjugated diene | 1.4-HD | 1.4-HD | EBH | EBH | VBH | VBH |
| | | Nonconjugated diene (mol %) | 0.4 | 0.4 | 1.0 | 1.0 | 0.4 | 0.4 |
| | | DSC peak temperature (°C.) | 126 | 126 | 70 | 70 | 125 | 125 |
| Chlorinated ethylene copolymer | Chlorination reaction | Stage 1 temperature (°C.) | 105 | 105 | 70–75 | 70–75 | 105 | 105 |
| | | Stage 2 temperature (°C.) | 125–130 | 125–130 | " | " | 125–130 | 125–130 |
| | | Chlorine content (wt. %) | 35 | 40 | 35 | 40 | 35 | 40 |
| | Physical properties unvulcanized | Stress at break (kg/cm$^2$) | 85 | 73 | 92 | 102 | 100 | 95 |
| | | Elongation at break (%) | 810 | 900 | 750 | 650 | 760 | 850 |
| | | Hardness (JISA) | 56 | 59 | 76 | 80 | 62 | 58 |
| | Physical properties vulcanized | Stress at break (kg/cm$^2$) | 195 | 185 | 210 | 240 | 210 | 210 |
| | | Elongation at break (%) | 650 | 700 | 450 | 350 | 630 | 640 |
| | | Surface hardness (JISA) | 63 | 66 | 83 | 87 | 71 | 70 |
| | | Oil resistance ΔV (%) | 60 | 30 | 60 | 30 | 60 | 30 |

Table 2

| | (Thermal stability) | | | | |
|---|---|---|---|---|---|
| Experiment No. | 1 | 9 | 10 | 11 | 12 |
| Thermal stability | 1 | 4 | 5 | 2 | 3 |

What is claimed is:

1. A chlorinated ethylene copolymer resin having a chlorine content of 5 to 50% by weight obtained by chlorinating an ethylene copolymer resin having a maximum peak temperature, as determined by differential scanning calorimetry (DSC), with a scanning temperature range of 0° C. to 170° C., of at least 100° C. by the aqueous suspension method at a temperature above 100° C. and a pressure sufficient to maintain said aqueous suspension in at least one chlorination stage, said copolymer resin being obtained by copolymerizing ethylene and as comonomer 0.02 to 2.0 mol % of at least one nonconjugated diene containing 5 to 15 carbon atoms using a polymerization catalyst comprising a solid catalytic component containing at least magnesium and titanium and an organic aluminum compound.

2. The chlorinated ethylene copolymer resin according to claim 1 wherein the nonconjugated diene is selected from vinylnorbornene, ethylidene norbornene and 1,4-hexadiene.

3. The chlorinated ethylene copolymer resin according to claim 1 wherein the ethylene copolymer resin is a copolymer of ethylene, a nonconjugated diene and less than 5.0 mol % of an α-olefin on the basis of the sum of α-olefin and ethylene.

4. The chlorinated ethylene copolymer resin according to claim 3 wherein proportion of the α-olefin to be copolymerized is 0.01–4 mol % on the basis of the sum of α-olefin and ethylene.

5. The chlorinated ethylene copolymer resin according to claim 3 wherein the α-olefin is 1-butene of 1-hexene.

6. Rubber obtained by vulcanizing a chlorinated ethylene copolymer resin according to claim 1.

* * * * *